(12) United States Patent
Sharp et al.

(10) Patent No.: US 6,661,963 B2
(45) Date of Patent: Dec. 9, 2003

(54) SYSTEM AND METHOD FOR CALIBRATING AND OPERATING A SEMICONDUCTOR VARIABLE OPTICAL ATTENUATOR

(75) Inventors: Richard Sharp, Wayland, MA (US); Vincent Scalesse, Tewksbury, MA (US); Ravindra N. Kolte, Chelmsford, MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 0 days.

(21) Appl. No.: 09/919,704

(22) Filed: Jul. 31, 2001

(65) Prior Publication Data

US 2003/0026581 A1 Feb. 6, 2003

(51) Int. Cl.[7] .................................................. G02B 6/00
(52) U.S. Cl. ........................ 385/140; 385/15; 324/71.1; 356/243.1; 250/252.1
(58) Field of Search ................ 385/15, 140; 356/243.1; 250/252.1; 324/71.1

(56) References Cited

U.S. PATENT DOCUMENTS

| | | | | |
|---|---|---|---|---|
| 4,071,751 A | * | 1/1978 | Waksberg | 250/201.1 |
| 5,742,268 A | * | 4/1998 | Noda | 345/84 |
| 6,108,119 A | * | 8/2000 | Devenport et al. | 359/181 |
| 6,151,438 A | * | 11/2000 | Espindola et al. | 385/140 |
| 6,208,798 B1 | * | 3/2001 | Morozov et al. | 385/140 |
| 6,246,826 B1 | * | 6/2001 | O'Keefe et al. | 385/140 |
| 6,317,233 B1 | * | 11/2001 | Son | 359/110 |
| 6,335,998 B2 | * | 1/2002 | Wagoner et al. | 385/12 |
| 6,370,312 B1 | * | 4/2002 | Wagoner et al. | 385/140 |
| 6,385,383 B1 | * | 5/2002 | Marcuse et al. | 385/140 |
| 6,411,430 B1 | * | 6/2002 | Ogino et al. | 359/337.11 |
| 6,434,318 B1 | * | 8/2002 | Bischel et al. | 385/140 |
| 6,466,729 B1 | * | 10/2002 | Wagoner et al. | 385/140 |
| 2002/0085791 A1 | * | 7/2002 | Kim | |

FOREIGN PATENT DOCUMENTS

EP          1055959 A2  *  11/2000  ............. G02F/1/09

* cited by examiner

*Primary Examiner*—Brian Healy
*Assistant Examiner*—Daniel J Petkovsek
(74) *Attorney, Agent, or Firm*—Lahive & Cockfield, LLP

(57) ABSTRACT

A method and apparatus for controlling the attenuation level of a semiconductor VOA relative to an absolute temperature of the VOA without the use of a power monitor is provided. The method includes the step of providing a variable optical attenuator for attenuating the optical signal. The variable optical attenuator is instructed to maintain the desired attenuation level of the optical signal. The temperature of the variable optical attenuator is periodically sensed, and a required voltage level is determined to achieve the desired attenuation level based at least partially on the periodically sensed temperature of the VOA. The method can further include the step of increasing and decreasing a voltage to the VOA to achieve the required voltage level and thus the desired attenuation level.

54 Claims, 7 Drawing Sheets

SYSTEM AND METHOD FOR CALIBRATING AND OPERATING A SEMICONDUCTOR VARIABLE OPTICAL ATTENUATOR

FIELD OF THE INVENTION

The present invention relates to semiconductor variable optical attenuators, and more particularly relates to calibrating and operating a semiconductor variable optical attenuator while factoring in changes in temperature.

BACKGROUND OF THE INVENTION

Variable optical attenuators (VOA) are utilized widely throughout optical communications networks. The primary function of a VOA is to control the optical power propagating within an optical fiber. VOAs have been developed with a variety of technologies. Some forms of VOA involve moving parts (spinning filter wheels or fiber flexure to induce controlled loss). Other technologies include electro-optic devices that do not require moving parts, for example, polarization rotation in an electro-optic crystal followed by a polarizer. Semiconductor VOAs fall into the latter category of electro-optic VOAs, for which no moving parts are necessary. In general, an electric field is applied to the semiconductor material, which by virtue of the Franz-Keldysh effect in bulk semiconductors, or the quantum-confined Stark effect in quantum well materials, moves the band gap of the material. The band gap can be illustrated as an opening allowing the passage of photons therethrough. A wider gap allows a lot of photons to pass through, while a narrow gap attenuates the amount of photons, and thus the optical signal, passing therethrough. A light wave propagating at a wavelength nearby to a band edge, but just under the band gap, can thus be exposed to a variable and voltage controllable attenuation.

Semiconductor VOAs are relatively small and can be integrated into other semiconductor opto-electronic components. Semiconductor VOAs can be manufactured in high volumes using standard semiconductor processing methods. Semiconductor VOAs have no moving parts, and thus tend to have long term reliability. The semiconductor material that forms the semiconductor VOA is neither piezoelectric, nor pyroelectric. Therefore, internal fields do not build up with stress or temperature, which might otherwise cause the attenuation level to change over time. At a fixed or known temperature, the semiconductor VOA attenuation level is highly repeatable.

However, the degree of attenuation produced by the semiconductor VOA is temperature dependent. The band gap (position of band edge) is sensitive to an applied electric field, and it is also sensitive to its absolute temperature. The variation of attenuation level can be substantial even over a few degrees of temperature variation. An optical tap (power monitor) is generally employed after the semiconductor VOA to measure and control the VOA attenuation level to maintain a constant known output power.

SUMMARY OF THE INVENTION

There is a need for a system and method for monitoring and controlling the attenuation level of the semiconductor VOA relative to an absolute temperature of the VOA without the use of a power monitor. The present invention is directed toward further solutions to address this need.

In accordance with one example embodiment of the present invention, a method of calibrating a VOA includes the step of heating or cooling the VOA to achieve a first constant temperature. The voltage is varied to the VOA, which correspondingly varies the attenuation level of the VOA. The attenuation levels supplied by the VOA are measured at different voltages and a first constant temperature of the VOA. The VOA is then heated or cooled to achieve a second constant temperature, and the steps of varying the voltage and measuring the attenuation levels for the second constant temperature are repeated.

In accordance with further aspects of the present invention, the voltage and attenuation levels are recorded. A calibration reference is then generated based on the voltage and attenuation levels. The calibration reference can take the form of at least one lookup table, at least one plotted curve, at least one data set, or at least one empirical equation.

According to further aspects of the present invention, an interpolation reference expressing a relationship between the temperature and attenuation levels for fixed voltage can be generated. The interpolation reference can take the form of at least one lookup table, at least one plotted curve, at least one data set, or at least one empirical equation.

According to further aspects of the present invention, an interpolation reference expressing a relationship between the temperature and voltage levels for fixed attenuation can be generated. The interpolation reference can take the form of at least one lookup table, at least one plotted curve, at least one data set, or at least one empirical equation.

In accordance with another embodiment of the present invention, the VOA can be disposed on a temperature controllable surface. The step of heating and cooling the VOA to achieve the first constant temperature and the second constant temperature can include varying the temperature of the temperature controllable surface to result in one of the first and second constant temperatures. In addition, the step of varying the voltage can include sending a digital instruction signal to a digital to analog converter and converting the digital instruction signal to an analog voltage output.

In accordance with still another example embodiment of the present invention, a method for attenuating an optical signal includes the step of providing a variable optical attenuator for attenuating the optical signal. The variable optical attenuator is instructed to maintain the desired attenuation level of the optical signal. The temperature of the variable optical attenuator is periodically sensed, and a required voltage level is determined to achieve the desired attenuation level based at least partially on the periodically sensed temperature of the VOA. The method can further include the step of increasing and decreasing a voltage to the VOA to achieve the required voltage level and thus the desired attenuation level.

The provision of a VOA can include the step of disposing a semiconductor type VOA on a thermal electric cooler. The thermal electric cooler represents a means for controlling the temperature of the semiconductor type VOA.

According to one aspect of the present invention, the instructing step can include delivering a predetermined electric field to the semiconductor type VOA to effect the attenuation level.

According to further aspects of the present invention, the step of providing the optical signal can be executed by powering a diode laser source, although a diode laser is not the only potential source for the optical signal. The step of fine tuning a wavelength of the optical signal can be accomplished by adjusting the temperature of the diode laser source. Each of the sensing and determining steps can occur on a periodic basis. A temperature sensor can be placed relative to the VOA to measure the temperature of the VOA.

In accordance with further aspects of the present invention, the voltage level determination can be carried out by looking up voltage levels on a lookup table based on the temperature of the VOA and desired attenuation level. The voltage level can be measured and compared with the required voltage level according to the lookup table.

Alternatively, the required voltage level can be determined by executing an algorithm to calculate the required voltage level based on the temperature of the VOA and the desired attenuation level. The determination of the required voltage level can include interpolating between calculated values of required voltage levels based on the temperature of the VOA and the desired attenuation level.

In accordance with yet another example embodiment of the present invention, a system is provided for emitting an optical signal. The system includes a temperature controllable surface. An optical signal source is disposed on the temperature controllable surface. A plurality of lenses are disposed in line with the optical path of the optical signal source. A VOA is disposed in line with the optical path of the optical signal source on the temperature controllable surface, and a temperature sensor is disposed to sense the temperature of the VOA.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1A:
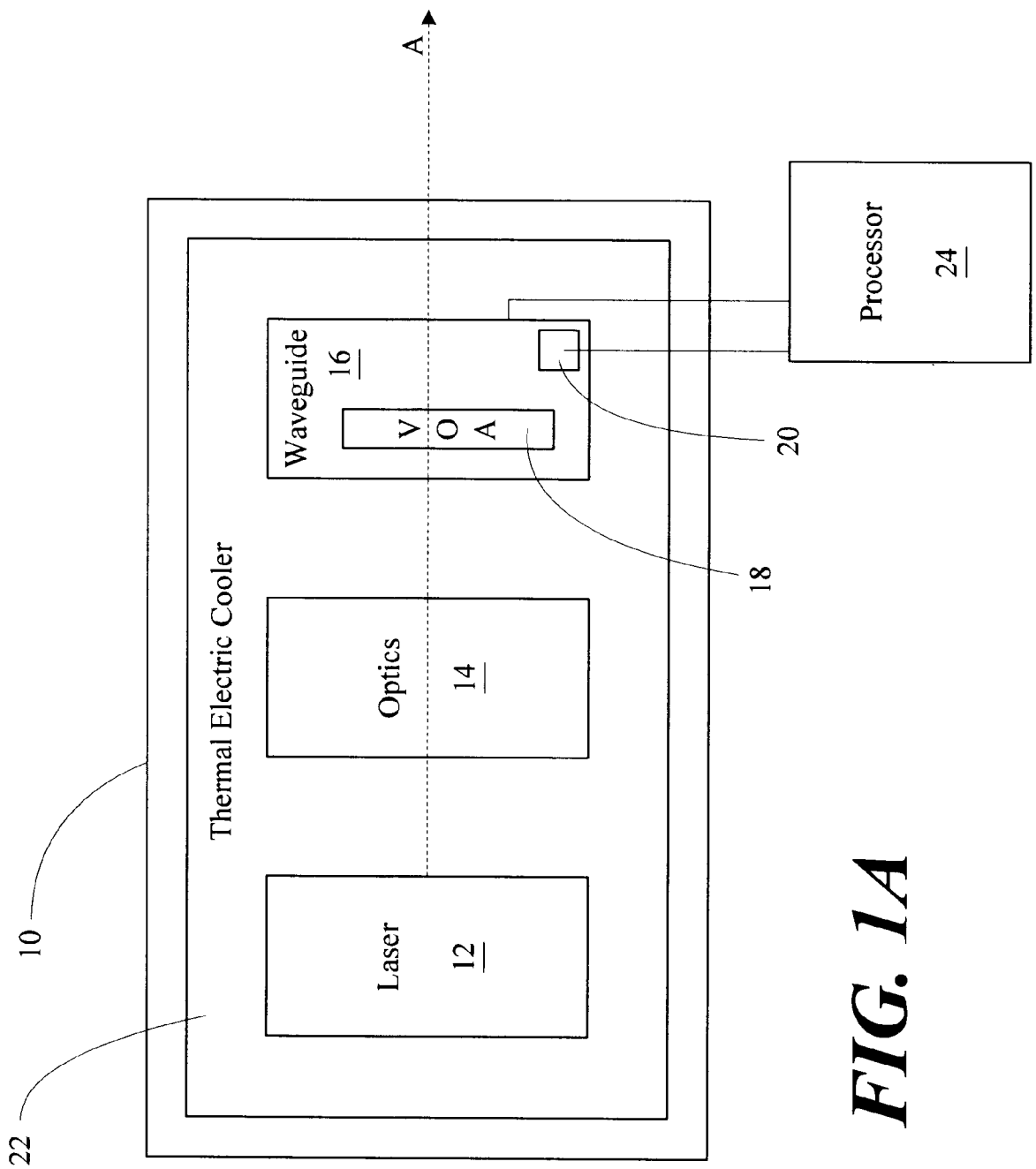
FIG. 1A is a schematic illustration of a source node in accordance with one aspect of the present invention.

In illustrative embodiments of the present invention, a semiconductor VOA is calibrated relative to temperature to monitor and substantially reduce any fluctuations in optical power transmitted through the VOA, without the need for an optical tap and/or associated feedback power monitor and feedback control loop. Once the semiconductor VOA has been calibrated, calibration references or equations can be used to determine if attenuation changes with temperature are of sufficient magnitude to require correction. If so, fine tuning adjustments to the output of the VOA can be made based on calibration references or equations to adjust the attenuation levels. Thus, the performance of a semiconductor VOA is enhanced by decreasing the variation in its attenuation levels without the need for additional hardware associated with any feedback control loop.

FIGS. 1A through 6, wherein like parts are designated by like reference numerals throughout, illustrate an example embodiment of a system and method for operating a semiconductor VOA according to the present invention. Although the invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials or processes, in a manner still in keeping with the spirit and scope of the present invention.

FIG. 1A illustrates an example source node 10 in accordance with the teachings of the present invention. A number of different node-types can form the source node 10, such a regenerator, an add/drop node, a transmitter node, and the like. The source node 10 includes a diode laser 12 as the optical signal source. One of ordinary skill in the art will recognize that a diode laser is merely one of multiple available optical signal sources. A number of different laser and light sources can also be utilized in conjunction with the method and apparatus of the present invention, and thus the present invention is not limited strictly to the use of a diode-type laser optical source.

The diode laser 12 provides the optical signal in the direction of arrow A (FIG. 1A) through a series of optics 14, which manipulate the laser into a desired optical format. The optics 14 can include one or more different optical lenses and other optical devices to modify and manipulate the optical signal, depending on the particular function of the optical signal. The particular selection and combination of optics 14 is not directly affected by the method and apparatus of the present invention. In addition, those of ordinary skill in the art are familiar with the variety and options available in constructing the optics 14 utilized. Therefore, further detail concerning the particular optics 14 utilized in the example embodiment will not be provided herein.

The optical signal continues through the optics 14 and then passes through a waveguide 16. The waveguide 16 controls the propagation of an optical signal so that the signal is forced to follow a path defined by the physical structure of the guide. The waveguide 16 includes a VOA 18 for attenuating the optical signal prior to exiting the source node 10. The illustrated configuration can vary as is appreciated by one of ordinary skill in the art.

At least one temperature sensing device is disposed on the waveguide 16 to measure a temperature of the waveguide 16 and the VOA 18. The temperature sensing device illustrated is, e.g., a thermistor 20, but can take the form of a number of different temperature sensing technologies. One advantage to the thermistor 20 is that the thermistor 20 has a relatively small size, which enables the easy coupling of the thermistor 20 to the VOA 18 within the shell of the source node 10.

The laser 12, the optics 14, the waveguide 16, and the VOA 18, all mount to a thermal electric cooler 22 platform. Each of these components can mount to form the source node 10 in accordance with a number of different arrangements, and on a number of different surfaces. However, if a diode laser 12 is utilized, there is a need for some form of temperature control to regulate and tune the diode laser 12. More specifically, the temperature of the diode laser 12 can affect the output of the laser. Adjusting the temperature of the diode laser 12 up or down will adjust the wavelength of the optical signal emitted from the diode laser 12.

In typical optical arrangements, it is desirable to be able to control the attenuation level of the optical signal to within ±0.5 dB. The source node 10 requires the thermal electric cooler 22 so that fine tuning adjustments can be made to the diode laser 12 to adjust the wavelength of the optical signal outputted by the diode laser 12.

Figure 1B:
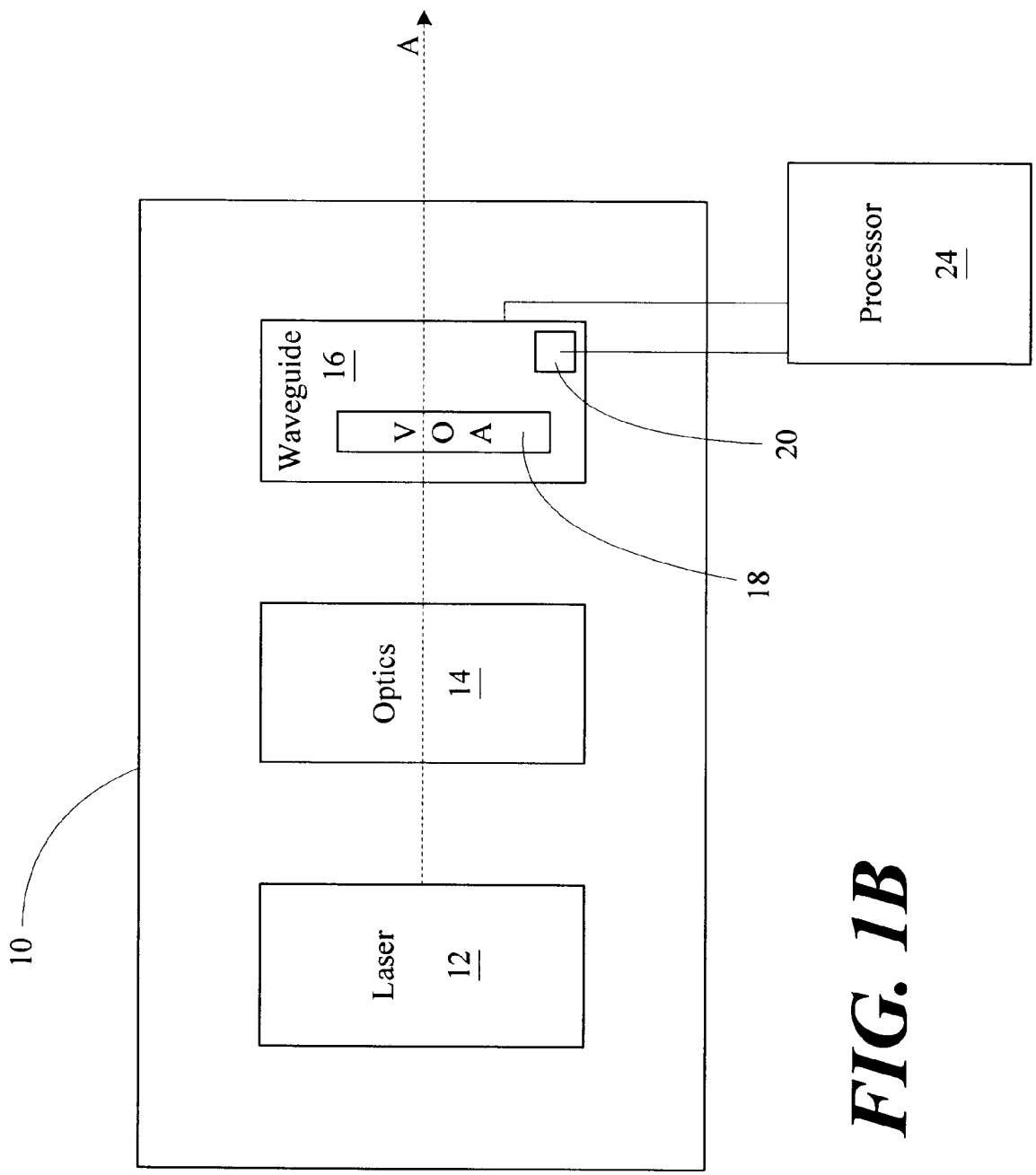
FIG. 1B is a schematic illustration of a source node in accordance with another aspect of the present invention.

Thus, the illustrated embodiment, having a diode form of laser 12, specifies the thermal electric cooler 22 platform as the surface upon which the various components mount to form the source node 10. The thermal electric cooler 22 controls the temperature of each of the components mounted thereon. The present invention additionally takes advantage of the thermal electric cooler 22 existence by utilizing the thermal electric cooler 22 to maintain the temperature of the VOA 18 within a predetermined range (i.e., the range at which the laser diode 12 most typically functions). The predetermined range of temperature makes it possible to predict the data required to adjust the voltage to the VOA as taught herein according to the present invention. However, one of ordinary skill in the art will appreciate that given sufficient resources to store or calculate voltage levels, the thermal electric cooler 22 is not required. Such an arrangement is depicted in FIG. 1B. If there is no thermal electric cooler 22, the VOA will operate at the temperatures of the surrounding environment.

In addition to the arrangement of components on the thermal electric cooler 22, a processor 24 is provided that is in communication with the thermistor 20 and the waveguide 16, including the VOA 18.

In operation, the diode laser 12 generates an optical signal in the form of a laser beam and propagates that laser beam in the direction of arrow A. The optical signal passes through the optics 14 and is manipulated and modified to a desired form of the optical signal. The optical signal then continues through the waveguide 16 and the VOA 18 before ultimately exiting the source node 10 and entering an optical component or fiber fed by the source node 10.

Upon further inspection of FIG. 1A, it will be recognized by one of ordinary skill in the art that a current known source node configuration additionally includes an optical tap in the form of a power monitor (not shown). The power monitor measures and controls the attenuation level of the VOA to maintain a constant and known output power. The power monitor measures the output of the VOA 18 and constantly readjusts the voltage level to the VOA 18 to adjust the attenuation level. The teachings of the present invention provide for the adjustment of the VOA 18 without the need for the power monitor, but can also work in conjunction with the power monitor if desired.

Figure 2:
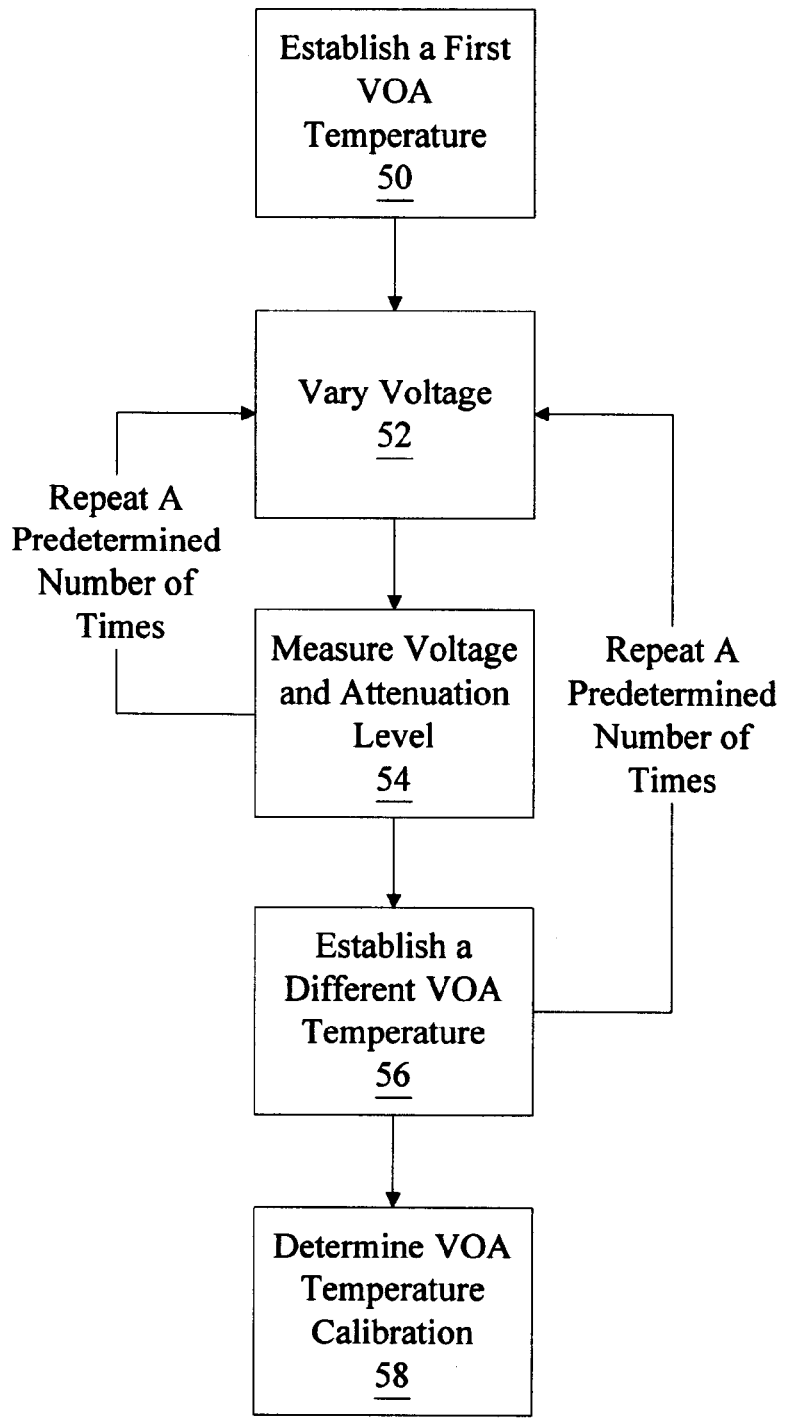
FIG. 2 is a flow chart illustrating a method of VOA calibration according to one aspect of the present invention.

FIG. 2 illustrates one example process for calibrating a semiconductor type VOA 18. First, the temperature of the VOA becomes a constant first temperature (step 50), measured in, e.g., degrees Celsius, Fahrenheit, or Kelvin. The thermal electric cooler 22 can help in this process by steadying the temperature of the VOA. Alternatively, the surrounding environment will affect the temperature of the VOA, absent some additional heating or cooling source.

An instruction either increasing or decreasing the voltage varies the voltage sent to the VOA and alters the resulting attenuation level (step 52). The voltage and attenuation levels are measured at a first voltage level (step 54). The process of varying the voltage and measuring the resulting voltage and attenuation levels (step 52 and 54) repeats a predetermined number of times. The predetermined number of times is indicative of the range of data desired by the calibration process. The increment between each increase or decrease can vary, and the overall range of voltage levels can vary, depending on the particular combination of devices and ultimate application for the data set. Independent of the number of data points taken, the resulting collection of measurements, or data points, establishes a collection of data representing the voltage into the VOA relative to the attenuation out of the VOA at the first temperature.

Once the predetermined number of voltage and attenuation readings is complete, the temperature control device, e.g., the thermal electric cooler 22, alters (increases or decreases) the VOA temperature to a second constant temperature (step 56). If desired, prior to changing the temperature of the VOA, the measurement of the voltage and attenuation readings at the first constant temperature can be repeated to ensure accuracy. This can be done at each of the temperature settings.

At the second VOA temperature, the process of varying the voltage and measuring the voltage and attenuation levels (steps 52 and 54) repeats the predetermined number of times as before.

The process of establishing a different VOA temperature (step 56), including the process of varying voltage levels and measuring voltage and attenuation levels, also repeats a predetermined number of times. This predetermined number of times corresponds to the desired number of data points ranging between different VOA temperatures. The more data points taken, the less interpolation is required at a later point in time when the data serves as a reference.

The performance of the VOA is then calibrated relative to each of the different temperature settings experienced by the VOA and the resulting attenuation levels (step 58). The calibration can yield a number of different forms of reference for determining the required voltage level. These forms of reference can include a lookup table, a plotted curve with extrapolated points, a data set, an empirical equation, and the like.

Figure 3:
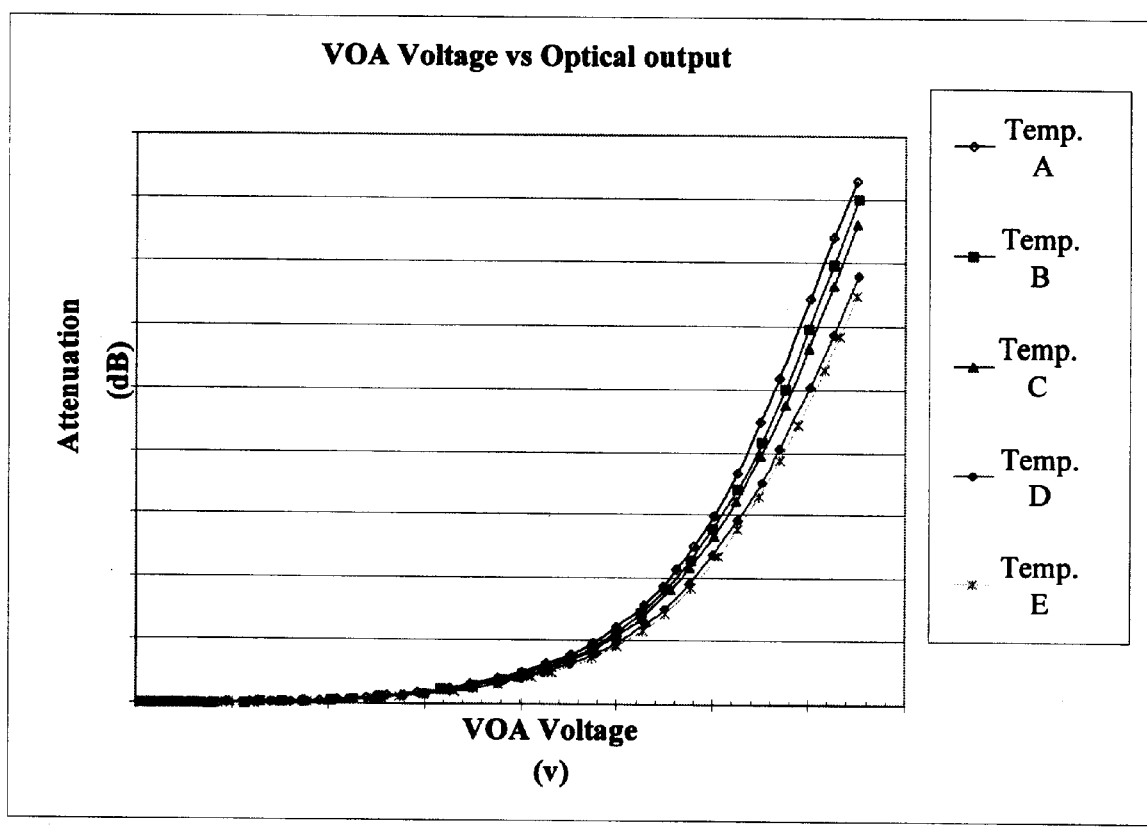
FIG. 3 is a graph of attenuation versus VOA voltage in accordance with one aspect of the present invention.

Pursuant to the calibration portion of the present invention, a first graph or plot is generated comparing the attenuation level to the VOA input voltage as seen in FIG. 3. There are five lines connecting various data points on this graph. Each line represents recorded attenuation levels resulting from recorded voltage inputs for a given temperature, e.g., temp A, B, C, D, or E. The resulting graph 60 illustrates that at a given voltage, the resulting attenuation level when the VOA is at temperature A differs from the resulting attenuation level at the same voltage when the VOA is at any of temperatures B, C, D, or E. This clearly shows the relationship between VOA temperature, and attenuation output at given voltages.

Based on the relationship between VOA temperature and VOA output, it can be stated that different temperatures of the VOA result in different attenuation levels at given input voltages. It becomes evident, therefore, that if the temperature of the particular semiconductor type VOA is not known, then a given input voltage will not necessarily result in a desired attenuation level. In prior art source node devices, the difference caused by the unknown temperature, and therefore unknown attenuation level, is compensated by the use of the power monitor. However, the teachings of the present invention can compensate for such differences without the added costs of the power monitor.

Figure 4:
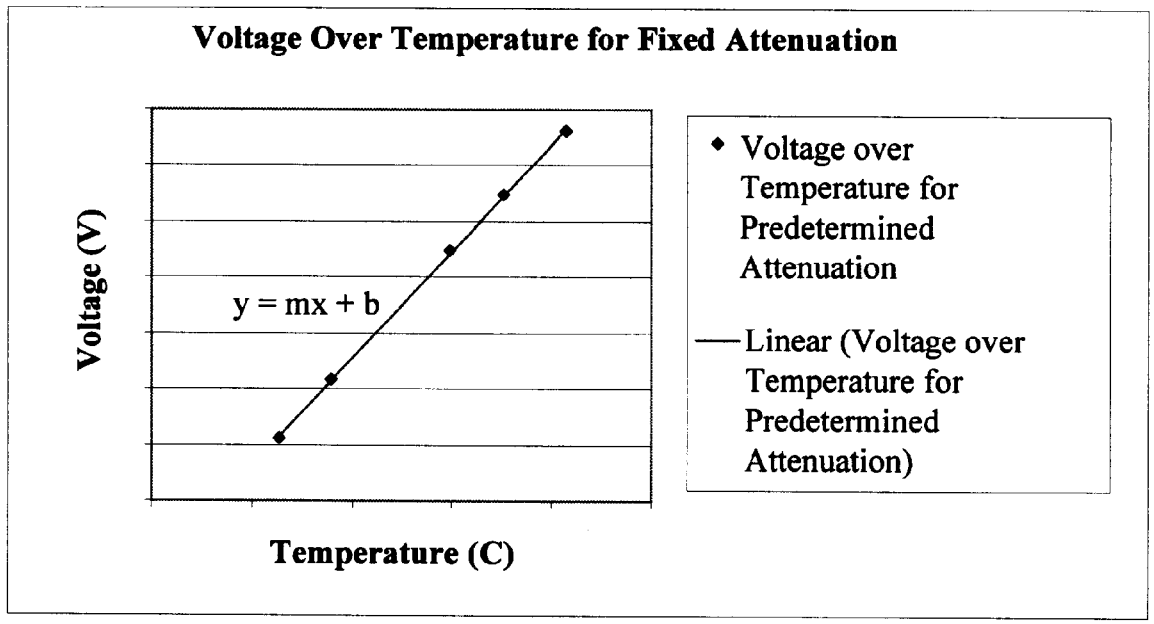
FIG. 4 is a graph of voltage versus temperature at fixed attenuation according to one aspect of the present invention.

Based on the details of the graph 60 if FIG. 3, one can then generate a second graph 62 as illustrated in FIG. 4. This graph 62 plots the voltage versus the temperature at predetermined attenuation levels. Upon inspection of FIG. 4, one of ordinary skill in the art will realize that there is a linear relationship between the voltage versus the temperature of the semiconductor type VOA at any fixed attenuation level.

Therefore it is possible to generate an empirical equation based on the linear relationship in the form of Y=mX+b, and more specifically in the form of Voltage m(Temperature)+b. It follows from this equation that at a given temperature, for a desired attenuation level, the required voltage can be calculated to result in the desired attenuation level.

Figure 5:
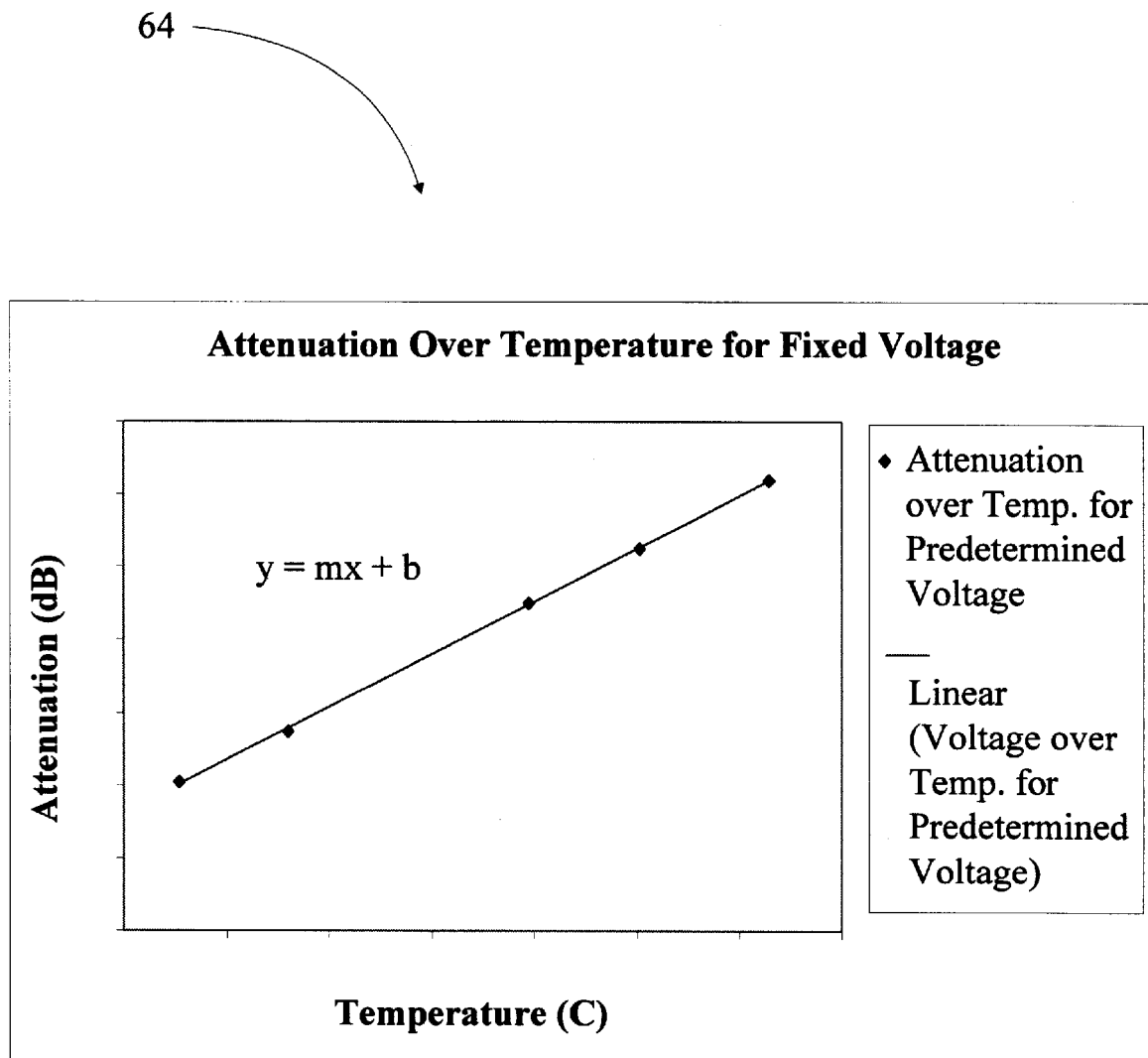
FIG. 5 is a graph of attenuation versus temperature at fixed voltage according to one aspect of the present invention.

Alternatively, based upon the details of the graph 60 in FIG. 3, one can generate a third graph 64 as illustrated in FIG. 5. This graph 64 plots the attenuation versus the temperature at predetermined voltage levels. Upon inspection of FIG. 5, one of ordinary skill in the art will realize that there is a linear relationship between the attenuation versus the temperature of the semiconductor type VOA at any fixed voltage level. Therefore it is possible to generate an empirical equation based on the linear relationship in the form of Y=mX+b, and more specifically in the form of A(Attenuation)=m(Temperature)+b. It follows from this equation that at a given temperature, for a given voltage level, the attenuation can be calculated. Thus, changes in VOA attenuation can be monitored at fixed voltage bias, in order to determine output power changes. Given sufficient magnitude, corrections for changes may be made using the previously described techniques.

Pursuant to the teachings of the present invention, once the calibration of the semiconductor VOA 18 has been executed, the voltage level required for a desired attenuation output at any given temperature can be calculated and then acted upon to result in the desired optical signal attenuation.

Figure 6:
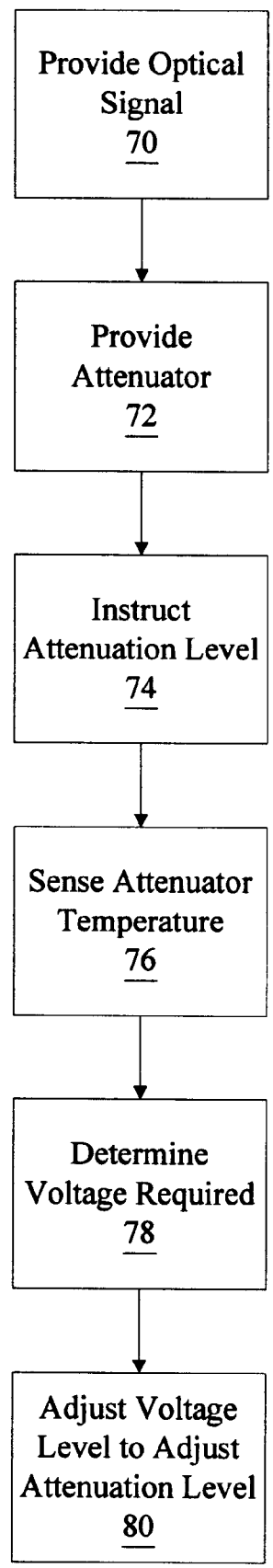
FIG. 6 is a flow chart illustrating attenuation adjustment according to one aspect of the present invention.

FIG. 6 illustrates one such embodiment of a voltage adjustment in accordance with the present invention. An optical signal source, such as, e.g., the diode laser 12, first provides an optical signal (step 70). The method includes the provision of a VOA 18, for manipulating the optical signal (step 72) in the form of attenuation. Instructions issue to the VOA 18 to execute a desired attenuation level of the optical signal (step 74). The thermistor 20, or an alternative temperature sensing device, senses the temperature of the VOA 18 (step 76).

The processor 24 receives the measured temperature of the VOA 18 and the desired attenuation level. The processor 24 then determines the required voltage utilizing the particular method resulting from a previously executed calibration step (step 78). As previously mentioned, the calibration (as described above) can yield a number of different forms of reference for determining the required voltage level. These forms of reference can include a lookup table, a plotted curve, a data set, an empirical equation, etc. The processor 24 references the particular calibration embodiment, and performs a comparison with the calibration embodiment to determine the voltage level required (step 78) to arrive at the desired attenuation level for the measured temperature. Once the required voltage is determined, the processor 24 instructs the adjustment of the voltage level to arrive at the desired attenuation level (step 80).

The relationship between each of the factors, e.g., the attenuation level, the temperature level, and the voltage level, of the VOA is not necessarily a linear relationship. Depending on the particular semiconductor VOA, there maybe a non-linear relationship between each of these factors. One of ordinary skill in the art will understand that this relationship can be determined during the calibration process, and an appropriate lookup table or other calibration reference can be determined such that the voltage level required for a particular VOA temperature can be calculated and executed to achieve desired attenuation levels. It will also be appreciated that the advancement provided by the teachings of the present invention allow the operation of a source node having a variable optical attenuator without the added component of a power monitor which adds expense to the overall source node device.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

What is claimed is:

1. A method for attenuating an optical signal, comprising the steps of:
   providing a semiconductor-type variable optical attenuator for attenuating the optical signal;
   receiving a request for the variable optical attenuator to maintain a desired attenuation level of the optical signal;
   sensing the temperature of the variable optical attenuator; and
   determining a required voltage level to achieve the desired attenuation level based at least partially on the sensed temperature of the variable optical attenuator, wherein the required voltage level is determined based on the sensed temperature of the variable optical attenuator to maintain the attenuation level constant regardless of the temperature of the variable optical attenuator.

2. The method of claim 1, further comprising the step of one of increasing and decreasing a voltage to the variable optical attenuator to achieve the required voltage level and adjust the desired attenuation level.

3. The method of claim 1, wherein the providing step comprises disposing a semiconductor-type variable optical attenuator on a thermal electric cooler.

4. The method of claim 1, wherein the sensing step comprises disposing a temperature sensor relative to the variable optical attenuator to measure a temperature of the variable optical attenuator.

5. The method of claim 4, wherein the step of disposing a temperature sensor comprises coupling a thermistor to the variable optical attenuator.

6. The method of claim 1, further comprising the step of providing a look-up table containing voltage levels corresponding to temperature and attenuation values.

7. The method of claim 6, wherein the step of determining a required voltage level comprises looking up voltage levels on said look up table based on the temperature of the variable optical attenuator and the desired attenuation level.

8. The method of claim 7, further comprising the step of measuring an existing voltage level supplying the variable optical attenuator.

9. The method of claim 8, further comprising the step of comparing the required voltage level with the existing voltage level to determine whether to increase or decrease the voltage level of the variable optical attenuator to achieve the desired attenuation level.

10. The method of claim 1, wherein the step of determining a required voltage level comprises executing an algorithm to calculate the required voltage level based on the temperature of the variable optical attenuator and the desired attenuation level.

11. The method of claim 1, wherein the step of determining a required voltage level comprises interpolating between calculated values of required voltage level based on the temperature of the variable optical attenuator and the desired attenuation level.

12. A method for attenuating an optical signal, comprising the steps of:
providing a semiconductor-type variable optical attenuator for attenuating the optical signal;
receiving a request for the variable optical attenuator to maintain a desired voltage level;
sensing the temperature of the variable optical attenuator; and
determining a required temperature of the variable optical attenuator to achieve a resulting attenuation value at the desired voltage level and adjusting the temperature of the variable optical attenuator to the required temperature based at least partially on the sensed temperature of the variable optical attenuator to maintain the attenuation level constant regardless of the temperature of the variable optical attenuator.

13. The method of claim 12, further comprising the step of one of increasing and decreasing an attenuation of the optical signal to achieve the desired voltage level.

14. The method of claim 12, wherein the providing step comprises disposing a semiconductor-type variable optical attenuator on a thermal electric cooler.

15. The method of claim 12, wherein the sensing step comprises disposing a temperature sensor relative to the variable optical attenuator to measure a temperature of the variable optical attenuator.

16. The method of claim 15, wherein the step of disposing a temperature sensor comprises coupling a thermistor to the variable optical attenuator.

17. The method of claim 12, further comprising the step of providing a look-up table containing attenuation values corresponding to temperature and voltage levels.

18. The method of claim 17, wherein the step of determining a resulting attenuation value comprises looking up attenuation values on said look up table based on the temperature of the variable optical attenuator and the desired voltage level.

19. The method of claim 18, further comprising the step of measuring an existing voltage level supplying the variable optical attenuator.

20. The method of claim 19, further comprising the step of comparing the required voltage level with the existing voltage level to determine whether to increase or decrease the voltage level of the variable optical attenuator to achieve the desired voltage level.

21. The method of claim 12, wherein the step of determining a resulting attenuation value comprises executing an algorithm to calculate the resulting attenuation value based on the temperature of the variable optical attenuator and the desired voltage level.

22. The method of claim 12, wherein the step of determining a resulting attenuation value comprises interpolating between calculated values of attenuation values based on the temperature of the variable optical attenuator and the desired voltage level.

23. A system for emitting an optical signal, comprising:
a temperature controllable surface;
an optical signal source disposed on the temperature controllable surface;
a plurality of lenses disposed in line with the optical signal source;
a semiconductor-type variable optical attenuator disposed in line with the optical signal source on the temperature controllable surface;
a temperature sensor disposed to sense the temperature of the variable optical attenuator; and
a processor for controlling an attenuation level of the variable optical attenuator at the desired voltage level based at least partially on the sensed temperature of the variable optical attenuator, wherein the temperature of the variable optical attenuator is adjusted by the temperature controllable surface based on the sensed temperature to maintain the attenuation level constant regardless of the temperature of the variable optical attenuator.

24. The system of claim 23, wherein the temperature sensor is a thermistor.

25. The method of claim 1 wherein the step of determining comprises the steps of:
providing the variable optical attenuator at a first temperature;
varying a voltage to the variable optical attenuator to achieve different voltages and to vary the attenuation level of the variable optical attenuator;
measuring attenuation levels produced by the variable optical attenuator at the different voltages and the first temperature;
modifying the temperature of the variable optical attenuator to achieve a second temperature; and
repeating the steps of providing, varying, measuring, and modifying to achieve calibration of the variable optical attenuator relative to different temperature values within a predetermined range of temperature values.

26. The method of claim 25, further comprising the step of recording the voltage and attenuation levels.

27. The method of claim 26, further comprising the step of generating a calibration reference based on the voltage and attenuation levels.

28. The method of claim 27, wherein the step of generating a calibration reference comprises creating at least one look up table containing voltage levels corresponding to temperature and attenuation values.

29. The method of claim 28, wherein the step of generating a calibration reference comprises creating at least one plotted curve containing voltage levels corresponding to temperature and attenuation values.

30. The method of claim 28, wherein the step of generating a calibration reference comprises creating at least one data set containing voltage levels corresponding to temperature and attenuation values.

31. The method of claim 28, wherein the step of generating a calibration reference comprises creating at least one empirical equation for calculating voltage levels corresponding to temperature and attenuation values.

32. The method of claim 27, further comprising the step of generating an interpolation reference expressing a relationship between the temperature and voltage levels at fixed attenuation levels.

33. The method of claim 32, wherein the step of generating an interpolation reference comprises creating at least one look up table containing voltage levels corresponding to temperature and attenuation values.

34. The method of claim 32, wherein the step of generating an interpolation reference comprises creating at least one plotted curve containing voltage levels corresponding to temperature and attenuation values.

35. The method of claim 32, wherein the step of generating an interpolation reference comprises creating at least one data set containing voltage levels corresponding to temperature and attenuation values.

36. The method of claim 32, wherein the step of generating an interpolation reference comprises creating at least one empirical equation for calculating voltage levels corresponding to temperature and attenuation values.

37. The method of claim 25, further comprising the step of disposing the variable optical attenuator on a temperature controllable surface.

38. The method of claim 37, further comprising a step of one of heating and cooling to achieve the first constant temperature and the second constant temperature comprising varying the temperature of the temperature controllable surface to result in one of the first and second constant temperatures.

39. The method of claim 25, wherein the step of varying the voltage comprises sending a digital instruction signal to a digital to analog converter and converting the digital instruction signal to an analog voltage output.

40. The method of claim 12 wherein the step of determining comprises the steps of:
providing the variable optical attenuator at a first voltage;
varying a temperature to the variable optical attenuator to achieve different temperatures and to vary the attenuation level of the variable optical attenuator;
measuring attenuation levels produced by the variable optical attenuator at the different temperatures and the first voltage;
modifying the voltage of the variable optical attenuator to achieve a second voltage; and
repeating the steps of providing, varying, measuring, and modifying to achieve calibration of the variable optical attenuator relative to different voltage values within a predetermined range of voltage values.

41. The method of claim 40, further comprising the step of recording the voltage and attenuation levels.

42. The method of claim 41, further comprising the step of generating a calibration reference based on the voltage and attenuation levels.

43. The method of claim 42, wherein the step of generating a calibration reference comprises creating at least one look up table containing attenuation values corresponding to temperature and voltage levels.

44. The method of claim 43, wherein the step of generating a calibration reference comprises creating at least one plotted curve containing attenuation values corresponding to temperature and voltage levels.

45. The method of claim 43, wherein the step of generating a calibration reference comprises creating at least one data set containing attenuation values corresponding to temperature and voltage levels.

46. The method of claim 43, wherein the step of generating a calibration reference comprises creating at least one empirical equation for calculating attenuation values corresponding to temperature and voltage levels.

47. The method of claim 40, further comprising the step of generating an interpolation reference expressing a relationship between the temperature and attenuation levels at fixed voltage levels.

48. The method of claim 47, wherein the step of generating an interpolation reference comprises creating at least one look up table containing attenuation values corresponding to temperature and voltage levels.

49. The method of claim 47, wherein the step of generating an interpolation reference comprises creating at least one plotted curve containing attenuation values corresponding to temperature and voltage levels.

50. The method of claim 47, wherein the step of generating an interpolation reference comprises creating at least one data set containing attenuation values corresponding to temperature and voltage levels.

51. The method of claim 47, wherein the step of generating an interpolation reference comprises creating at least one empirical equation for calculating attenuation values corresponding to temperature and voltage levels.

52. The method of claim 40, further comprising the step of disposing the variable optical attenuator on a temperature controllable surface.

53. The method of claim 52, further comprising a step of one of heating and cooling to vary the temperature of the temperature controllable surface to result in varied VOA temperatures.

54. The method of claim 40, wherein the step of modifying the voltage comprises sending a digital instruction signal to a digital to analog converter and converting the digital instruction signal to an analog voltage output.

* * * * *